Oct. 30, 1923.

G. F. WOELFEL 1,472,110

DRIVING APPARATUS

Filed March 15, 1922

INVENTOR:
GEORGE F. WOELFEL
BY
ATTORNEY

Patented Oct. 30, 1923.

1,472,110

UNITED STATES PATENT OFFICE.

GEORGE F. WOELFEL, OF LAKEWOOD, OHIO, ASSIGNOR OF ONE-HALF TO WALTER H. ABBOTT, OF EAST CLEVELAND, OHIO.

DRIVING APPARATUS.

Application filed March 15, 1922. Serial No. 544,013.

*To all whom it may concern:*

Be it known that I, GEORGE F. WOELFEL, a citizen of the United States, resident of Lakewood, county of Cuyahoga, and State of Ohio, have invented new and useful Improvements in Driving Apparatus, of which the following is a specification, the principle of the invention being herein explained and the best mode in which I have contemplated applying that principle, so as to distinguish it from other inventions.

My invention relates to apparatus for driving a pumping or compressing apparatus, its object being to increase the efficiency of the apparatus by completely catching and conserving the fluid leakage past the compressing element.

The said invention consists of means hereinafter fully described and particularly set forth in the claims.

My invention is particularly applicable to the driving mechanism for operating a pump for a refrigerating plant in which it is particularly desirable to prevent the cooling fluid from escaping into the atmosphere.

Heretofore driving mechanism of this type which has been used to operate a pump for a refrigerating plant has employed an enclosing casing which surrounded or communicated with the end of the pump cylinder, and which housed connections between a motor shaft and the pump piston. This shaft extended out through the walls of the casing, the latter being provided with a suitable stuffing box for preventing leakage around said shaft. Inasmuch, however, as the efficacy of the stuffing box is limited by reason of the fact that it cannot be tightened beyond a certain point, it was impossible to completely prevent such leakage and this fact has always been a detrimental element in this class of devices.

More specifically my invention contemplates the provision of an apparatus consisting of a sealed enclosing casing with which is connected a pump cylinder provided with a suitable piston and within which is mounted a motor, whereby the usual stuffing boxes are omitted, and an intermediate transmission means for connecting said motor with the piston in said pump cylinder.

The annexed drawing and the following description set forth in detail certain means embodying my invention, the disclosed means, however, constituting but one of the various mechanical forms in which the principle of the invention may be employed.

Figures 1, 2:
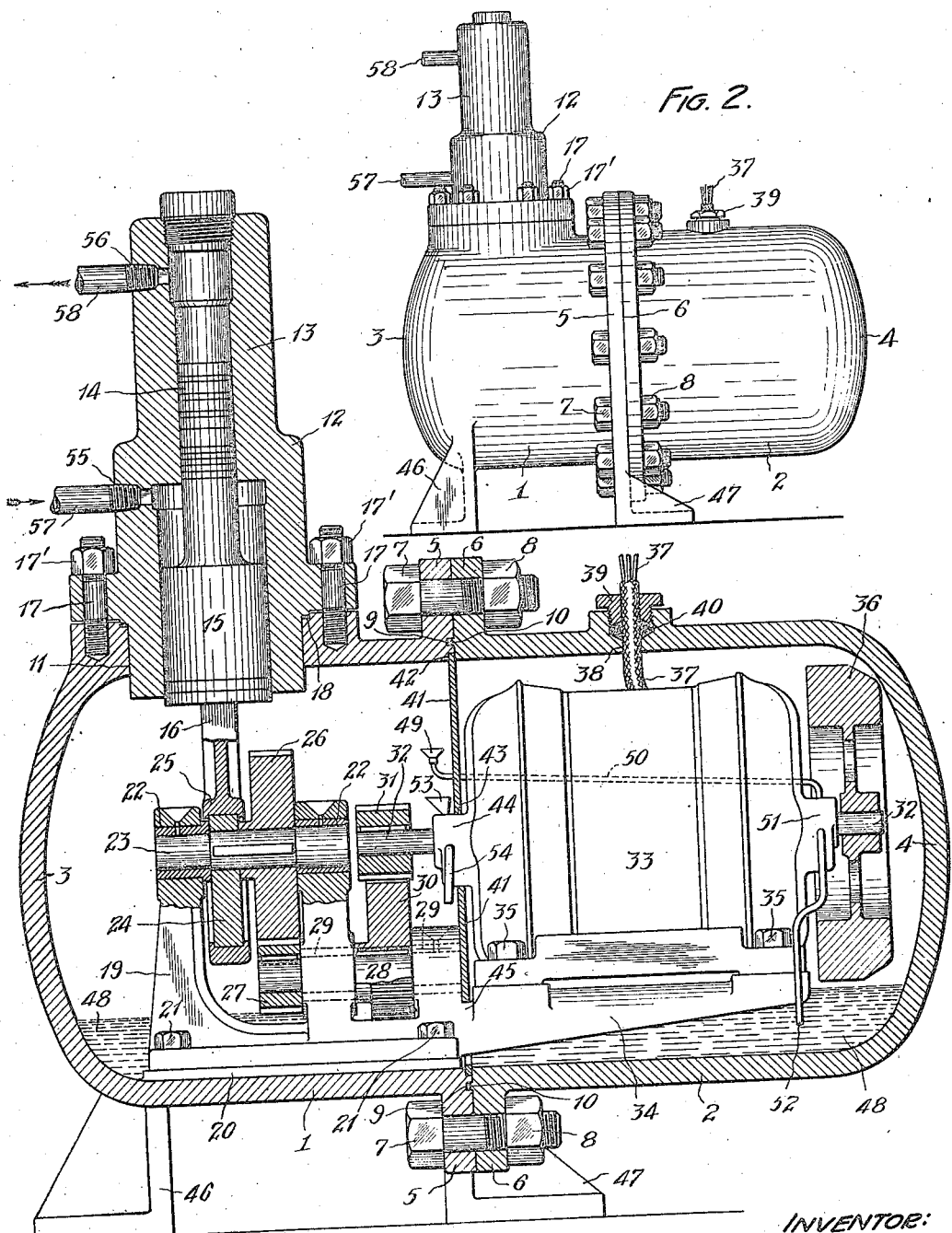
Fig. 1 represents a vertical axial section of a device embodying my invention, showing parts thereof in elevation.
Fig. 2 represents upon a reduced scale a side elevation of such apparatus.

The illustrated embodiment of the invention comprises an enclosing casing which consists primarily of a part 1 and a part 2, the outer end of part 1 being provided with an integral head 3 and the outer end of part 2 being provided with an integral head 4, the two parts being generally of cylindrical form. The inner ends of these parts are provided with flanges 5 and 6 respectively which are secured to each other by means of suitable bolts 7 and nuts 8 as shown in Fig. 1. A suitable sealing connection is provided such as a groove 9 in the end surface of one of said parts and a gasket 10 seated therein as will be readily understood, whereby the connection is made gas-tight. It will hence be noted that the parts of the casing are separable upon a vertical plane.

In the upper portion of the casing part 1 is formed a circular opening 11 in which is seated a pump 12 consisting of a pump cylinder 13 and a suitable piston 14 therefor. This pump is of ordinary and usual single acting construction, the cross-head 15 being preferably of piston form and having a suitable connecting rod 16 associated therewith, and is secured in place by means of studs 17 and nuts 17', a suitable gasket 18 being provided for sealing the connection.

Secured to the inside of the bottom of the casing part 1 is a base casting 19 which is secured to a seat 20, forming an integral part of said casing part, by means of suitable screws 21. This base casting is provided with suitable bearings 22 wherein is mounted a shaft 23 upon which is keyed an eccentric 24. This eccentric is mounted in an eccentric strap 25 formed upon the lower end of the connecting rod 16. Also keyed to the shaft 23 is a gear 26 which meshes with a pinion 27 keyed to a second shaft 28, the latter being mounted in bearings 29 also supplied by the base casting 19. Also keyed to the shaft 28 is a second gearwheel 30 which meshes with a second pinion 31 keyed to the shaft 32 of an electric motor 33.

The base casting 19 is formed with a lateral extension 34 which projects into the casing part 2, but is wholly unsupported thereby. The motor 33 is mounted upon this projection 34 and is secured thereto by means of suitable screws 35. The said extension is of a length such that the motor may, as illustrated, be mounted thereon and lie substantially wholly within the casing part 2.

The opposite end of the motor is provided with a suitable fly-wheel 36 secured to the outer end of the motor shaft 32.

Current is supplied to the motor through the leads 37 which pass into the casing through an opening 38, the said leads being sealed by means of a suitable stuffing box 39 and packing 40.

Intermediate of the two parts of the casing is a diaphragm 41 whose periphery is seated in an annular groove 42 formed in the casing part 1, said diaphragm being held in place by the abutting surface of the other casing part. The center of this diaphragm is provided with an opening 43 through which the inner boss 44 of the motor projects. A suitable opening 45 is also provided in said diaphragm through which the projection 34 of the base casting 19 passes.

The bottom of one end of the casing part 1 is provided with two supporting legs 46 and the bottom of the flange 5 at the other end of said casing part is provided with two additional supporting legs 47. It will thus be noted that the entire apparatus is supported from one of said casing parts.

A supply 48 of oil is provided upon the interior of the casing which oil is supplied to the various bearings within the casing part by splashing as will be understood.

A funnel 49 is located within the casing part 1 and is connected by means of a pipe 50 with the outer bearing 51 of the motor shaft, a suitable overflow pipe 52 being connected with this bearing for conducting superfluous oil back to the bottom of the casing. A similar funnel 53 is provided for the inner bearing of the motor shaft and a suitable overflow pipe 54 also is provided, all as will be readily understood. These funnels collect sufficient oil for lubricating the motor bearings, in the usual manner.

The pump cylinder 13 is provided with the inlet opening 55 and the discharge opening 56 with which are respectively connected the inlet pipe 57 and feed pipe 58 of the circulatory part of the refrigerating system (not shown), as will be understood.

By providing the extension 34 and mounting the motor thereon, the casing part 2 may be removed when it is desired to examine or repair the motor by removing the nuts 8 from the bolts 7 and loosening the stuffing box 39 to allow the leads to slide in the opening 38. When this is done the said casing part 2 may be separated from the casing part 1, leaving the motor exposed and supported by the extension 34, which extension as has been heretofore noted is completely unconnected with the casing part 2. This procedure is further permitted and made feasible by reason of the fact that the supporting legs 46 and 47 form a part of the casing part 1.

The diaphragm protects the motor from the oil splashing in the part 1, as will be understood.

From the above described construction it will be noted that the motor driving apparatus is housed within a sealed and completely closed casing, and that therefore no leakage of gases from within the casing to the exterior is possible. As a result, such fluid leakage as may occur past the pump piston will discharge into the enclosing casing or into the compression chamber according to the direction of flow. In either event the leakage results in no loss whatever as the fluid has no opportunity to leak into the atmosphere, and is hence completely caught or conserved and used over again.

What I claim is:

1. The combination of an entirely closed sealed vessel; a motor completely encased within said vessel; and a pumping or compressing mechanism actuated by said motor, located within said vessel; piping connections to and from the pump or compressor outside of said sealed vessel; whereby fluid leakage past the compressing element will be completely caught and conserved by said vessel and reused.

2. In a driving apparatus, the combination of an enclosing casing comprising two separable parts; a supporting base member secured to the interior of one of said parts only, said member extending into the other part.

3. In a pumping apparatus, the combination of a sealed casing; a cylinder mounted upon the latter; a piston in said cylinder; a connecting rod for said cylinder and extending into said casing; a motor mounted within and enclosed by said casing; and gearing mounted within and enclosed by said casing and connecting said motor with said connecting rod.

4. In a driving apparatus, the combination with an enclosing sealed casing comprising two separable parts; of a motor mounted within said casing and wholly supported by one of said parts.

5. In a driving apparatus, the combination of an enclosing casing comprising two parts separable upon a vertical plane; a base member within said casing for supportng a motor and secured to one of said parts only, said member extending into the other part; and a motor mounted upon said member and in the latter casing part.

6. In a driving apparatus, the combination of an enclosing casing comprising two parts separable upon a vertical plane; a supporting base member within said casing and secured to one of said parts and provided with an extension projecting into the other of said parts but wholly unsupported thereby.

7. In a driving apparatus, the combination of an enclosing casing comprising two parts separable upon a vertical plane; a base member for supporting a motor and secured to one of said parts only; said member extending into the other part; a motor mounted upon said member and in the latter casing part; the part of the casing to which the base member is secured being provided with legs adapted to form the support for the entire casing.

8. In a driving apparatus, the combination of a sealed enclosing casing; a motor mounted within and enclosed by said casing; a driven member connected with the latter; gearing mounted in said casing and connecting said motor with said driven member; and a diaphragm separating said motor from said gearing.

9. In a pumping apparatus, the combination of a sealed casing comprising two parts separable upon a vertical plane; a pump cylinder mounted upon one of said parts; a piston in said cylinder and a suitable connecting rod therefor; a train of gears mounted in one of said casing parts and connected with said connecting rod; and a motor connected with said gear train for driving same and positioned in the other casing part but supported wholly by said first named casing part.

10. In a pumping apparatus, the combination of an enclosing multi-part casing having its parts joined by a sealing connection; a pump having a sealing connection with said casing; a motor mounted within said casing; and connections between said motor and the pump piston whereby the latter may be driven by the motor.

Signed by me this 23rd day of February, 1922.

GEO. F. WOELFEL.